United States Patent [19]
Williams

[11] Patent Number: 5,829,575
[45] Date of Patent: Nov. 3, 1998

[54] LOAD BAR ASSEMBLY

[76] Inventor: Alan S. Williams, 1003 Clearview Dr., Middletown, Pa. 17057

[21] Appl. No.: 781,484

[22] Filed: Jan. 10, 1997

[51] Int. Cl.⁶ .................................................. B65G 17/20
[52] U.S. Cl. ..................... 198/678.1; 198/680; 198/687.1
[58] Field of Search ............................... 198/678.1, 680, 198/683, 687.1

[56] References Cited

U.S. PATENT DOCUMENTS

| | | |
|---|---|---|
| 3,608,701 | 9/1971 | Dieter . |
| 3,854,573 | 12/1974 | Freier, Sr. . |
| 4,890,724 | 1/1990 | Loewenthal ............................. 198/732 |
| 5,144,790 | 9/1992 | Tisma ........................................ 53/251 |

FOREIGN PATENT DOCUMENTS

| | | | |
|---|---|---|---|
| 0578232 | 10/1977 | U.S.S.R. ................................ | 198/680 |
| 0581020 | 11/1977 | U.S.S.R. .............................. | 198/687.1 |
| 0785137 | 12/1980 | U.S.S.R. .............................. | 198/678.1 |
| 0854825 | 8/1981 | U.S.S.R. .............................. | 198/678.1 |

*Primary Examiner*—James R. Bidwell
*Attorney, Agent, or Firm*—Connolly & Hutz

[57] ABSTRACT

A load bar assembly is connected for movement with a continuous conveyor system having a path of travel that includes 90 degree turns for transporting goods in an industrial facility to various locations along the path of travel of the conveyor system. The load bar assembly includes an elongate load bar from which the goods are suspended, and the overall bar is significantly longer than the radius of curvature of the smallest 90 degree turn of the conveyor system. To prevent binding of the load bar as it travels along the curved portions of the continuous conveyor system, connection of the load bar to the conveyor system includes two spaced apart attachment points, at least one of which is movable toward and away from the other. The distance between the two points of attachment is shortened as the load bar travels along the curved conveyor portions, and this arrangement prevents binding of load bar which would otherwise occur with a relatively long load having both points of attachment fixed relative to one another.

11 Claims, 4 Drawing Sheets

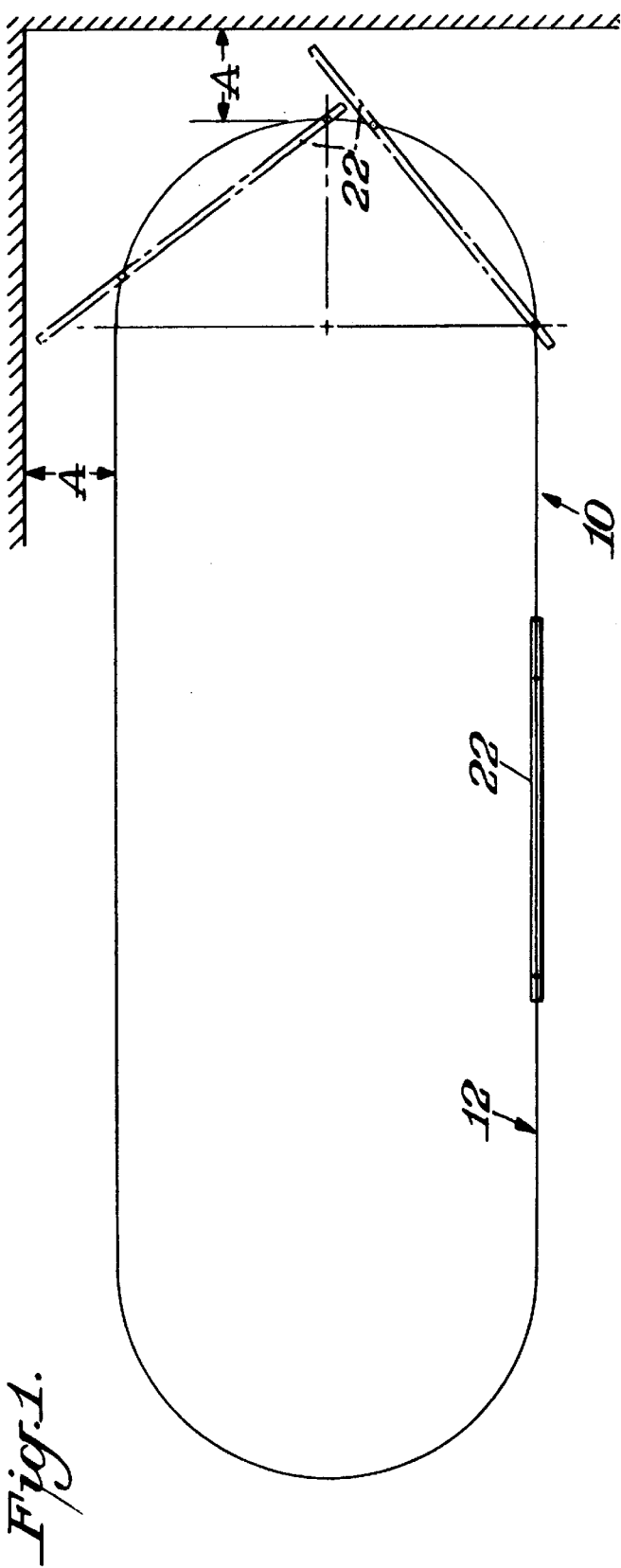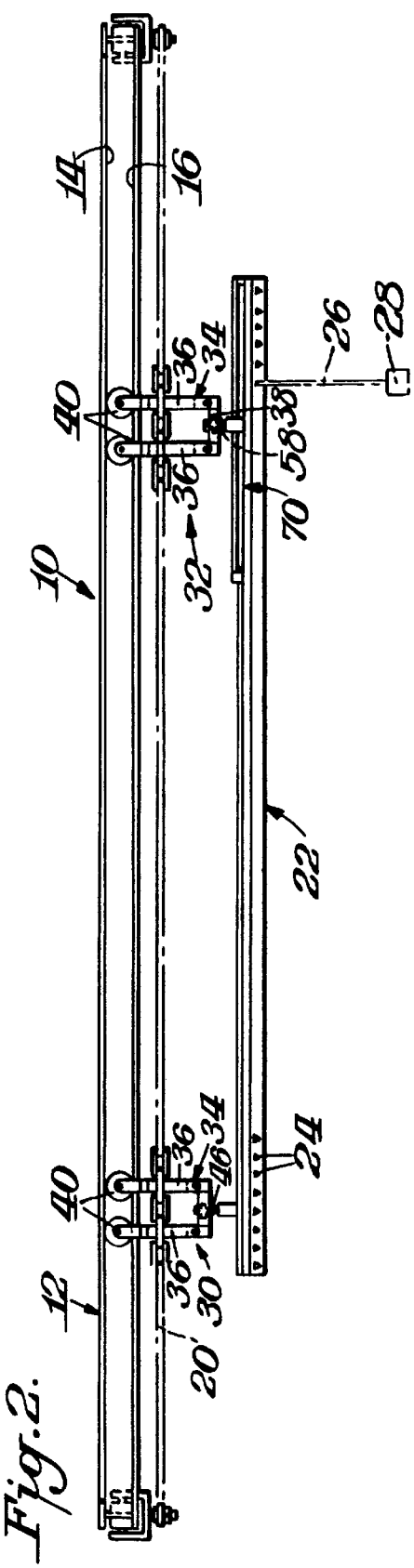

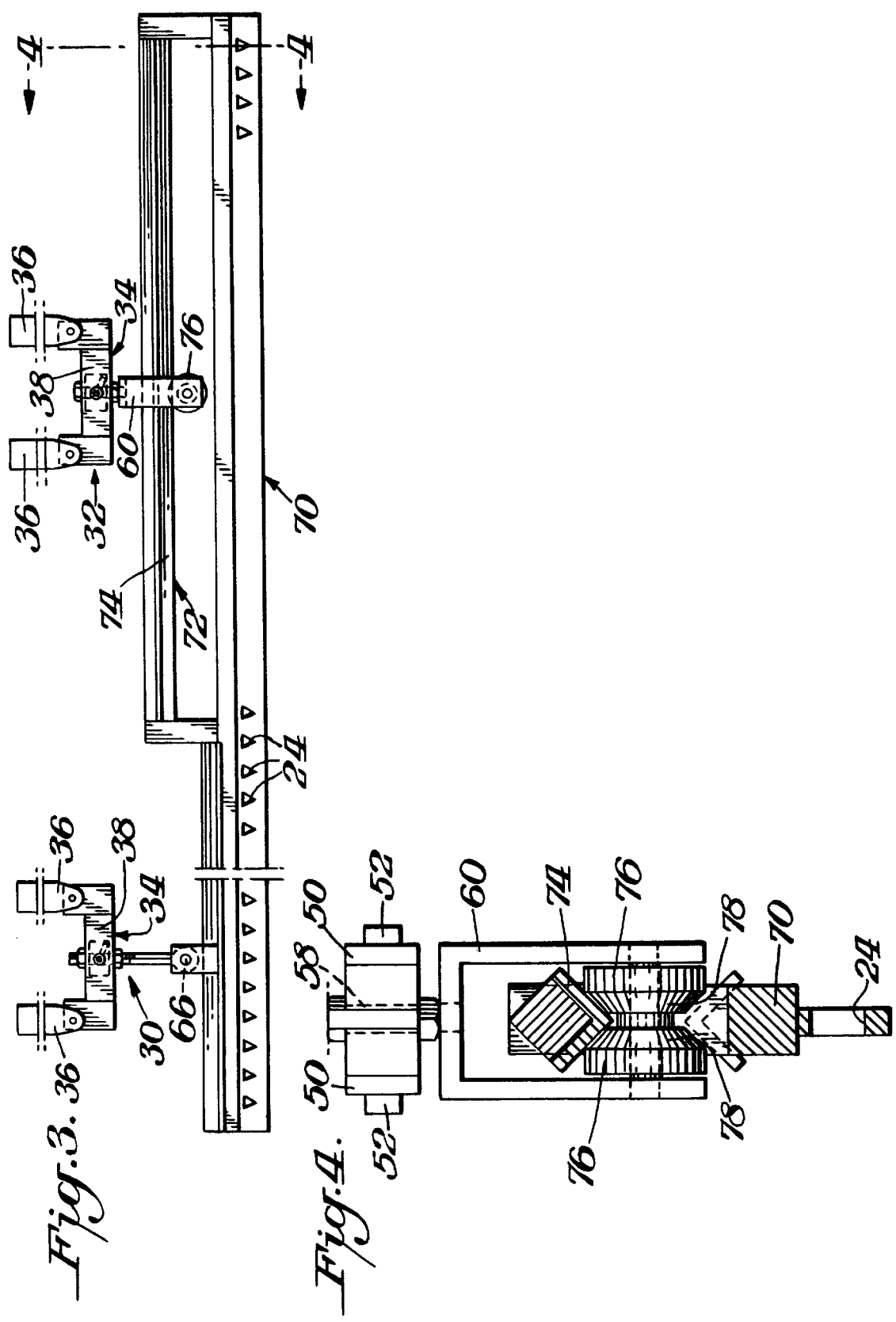

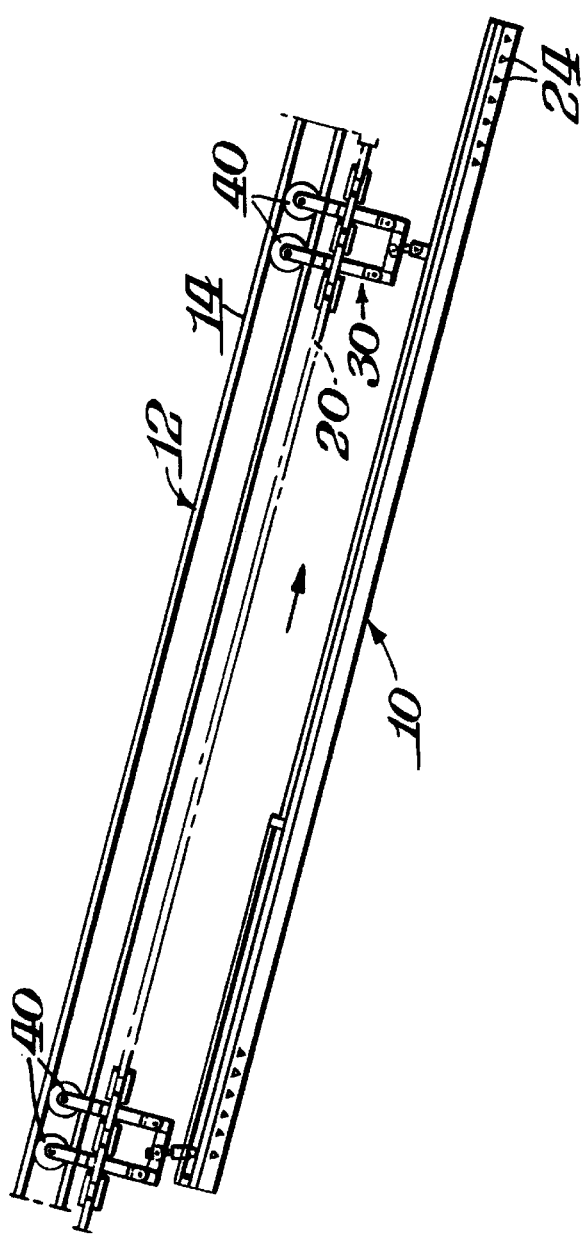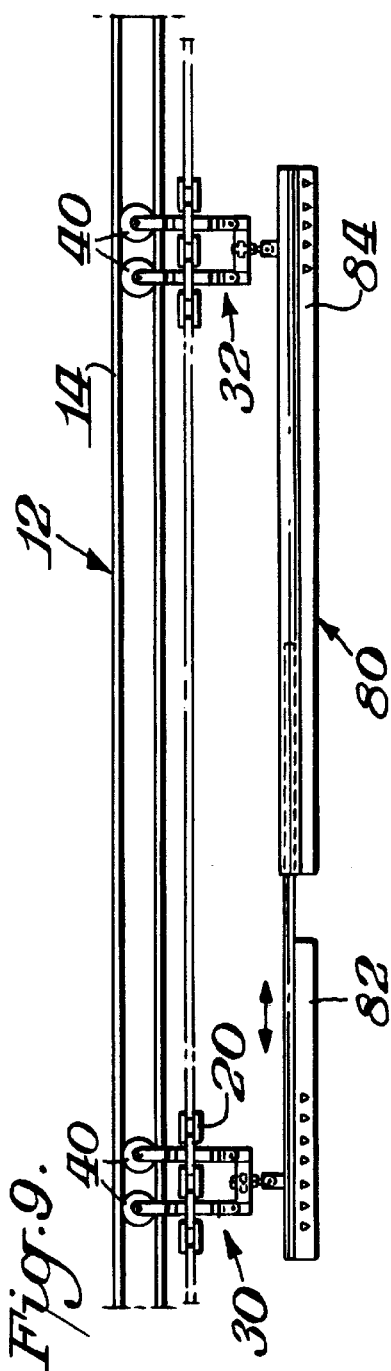

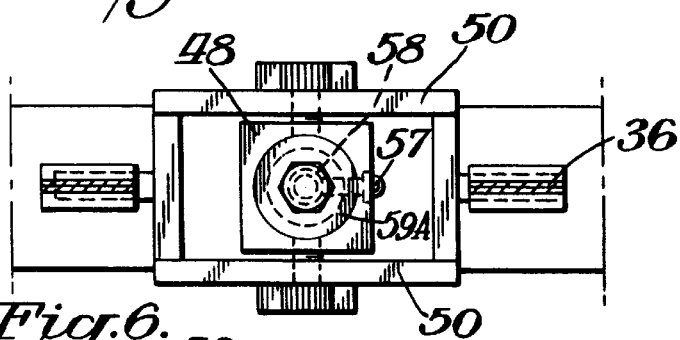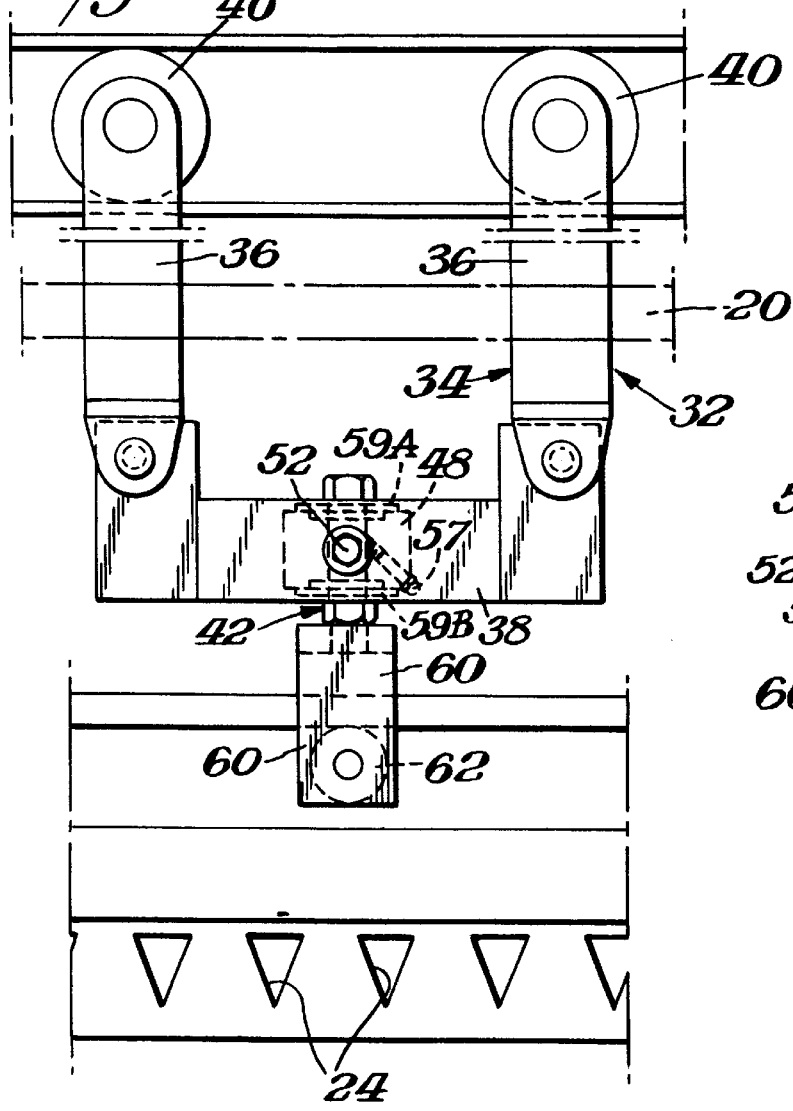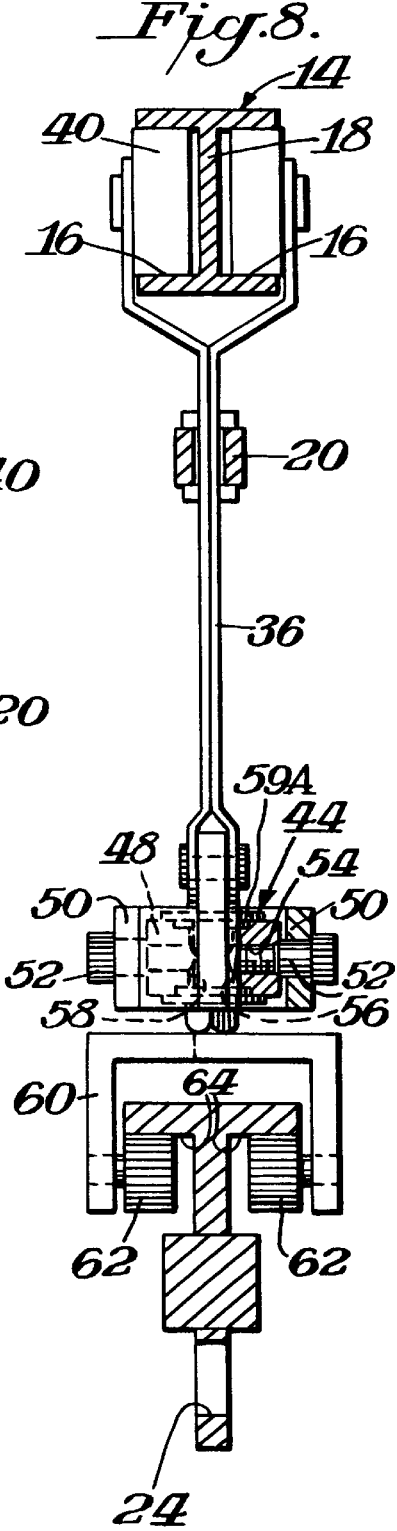

LOAD BAR ASSEMBLY

BACKGROUND OF THE INVENTION

The present invention relates to a load bar assembly, and more particularly to a non-binding load bar assembly for use in a continuous conveyor system where the load bar has an overall length significantly greater than the smallest encountered radius of curvature of the conveyor system.

The movement of materials within an industrial environment is often facilitated by use of a continuous conveyor system that essentially consists of a movable continuous length of chain attached to an overhead tramway by wheels. In most instances a horizontal bar, called a "load bar" is attached below this chain, and this load bar is often bolt-attached and is immovably attached or "locked" to the chain at two points, generally at or close to each end of the load bar. Directly above the load bar/chain attachment point is most often a set of wheels that traverse a tramway that holds and stabilizes the continuous chain. These wheels support the combined weight of the load bar and any load that may be attached to and suspended therefrom. Load bars are used as a convenient fixture from which to attach or hang items to be conveyed from one location to another in an industrial facility.

The chain of a chain conveyor system generally moves at a fixed distance from the support floor of the industrial facility, but it can also move to and from different elevations along inclined portions thereby raising and lowering the load bar.

The ends of the load bar are often attached to the overhead conveyor chain by slender cylindrical rods placed through a link of chain and attached to the overhead tramway in such a way that the rods downwardly extend through the chain perpendicular to the floor. The lower end of each cylindrical rod attaches to the load bar, and these rods bear the combined weight of the load bar and any weighted items attached thereto.

If a chain conveyor system is continuous, its chain must travel through the equivalent of two 180 degree turns. Generally a chain will encounter a multiplicity of 90 and 180 degree turns as it circumnavigates its way throughout the industrial facility.

Since a load bar is generally inflexible, and its payload if large is generally inflexible, no problem is encountered if the conveyor system and load bar assembly travel along a straight-line path of the conveyor system. However, depending upon the length of the load bar, problems may arise when the load bar travels along a curved portion of the conveyor system.

In the prior art, a "captive" load bar (of length=L) is usually attached to a continuous chain conveyor at two points, point "A" and point "B" (whose distance apart=AB). These two points generally are located at or near both ends of the load bar. The load bar must circumnavigate the chain conveyor's course, which most often means traveling through a number of 90 degree curves.

It is at the juncture of such a curve that the chain, being flexible, moves forward and assumes the shape of the arc of the radius of curvature R, which after a time will have traveled along this arc for a distance of AB. The actual length of this curve or arc of chain is called the chain arc length, and is defined as "arc AB". At the same time, the load bar attachment points, since they are directly attached to the chain, following the exact same arced course. But since the load bar is inflexible and cannot bend, and thus must stay in a straight line, the load bar itself assumes the geometric position of a chord between the two points A and B (defined as "chord AB"), which is the straight line distance between the arc points A and B.

Geometrically any arc AB is always greater than its inscribed chord AB (arc AB>chord AB, for all cases except when R=infinity), and the difference between these two lengths may be called "E" (E=arc AB−chord AB).

Since it is a geometric impossibility to have arc AB the same length as chord AB, in a real life "perfect" chain conveyor system, any differential distance E, would cause the chain to bind and either stop or break the chain or break something in the conveyor system. A perfect chain conveyor system would mean that there is absolutely no forgiveness (looseness, play, give or "slop") in the system that would allow non-binding to occur at some significant value of E.

But real-life chain conveyor systems are not perfect, and generally they have a certain amount of forgiveness to them. On average there is enough forgiveness in most chain conveyor systems to allow a load bar of maximum length "$L_{max}$" to traverse through a radius of curvature R, if the length of the load bar is equal to or less than the radius of curvature ($L_{max} \leq R$). Quite often $L_{max}$ cannot be equal to R, but must be less than the radius of curvature or the conveyor system will bind and stop.

For example, a chain conveyor system that includes a radius of curvature of 8 feet only allows a load bar of maximum length equal to or less than 8 feet to travel through such a radius without binding. If this load bar is greater than 8 feet, it causes the system to bind and stop or break. Unlike the prior art, the present invention is directed to a load bar assembly having a load bar length significantly greater than radius of curvature R.

SUMMARY OF THE INVENTION

Accordingly, it is an object of the present invention to provide a load bar assembly of significant length for use with a continuous conveyor system irrespective of any radius of curvature of the path of travel of the conveyor while allowing the load bar to traverse the complete conveyor path without binding.

Another object of the present invention is a load bar assembly capable of moving up and down in elevation without placing undue torque and shear forces on the attachments between the load bar assembly and the continuous conveyor system to which it is secured.

Still another object of the invention is a load bar assembly and continuous conveyor system which maximizes the efficient use of valuable floor space in an industrial facility.

Another object of the present invention is a load bar assembly which is simple in construction and easy to use.

In accordance with the present invention, a load bar assembly comprises an elongate load bar with connections for securing the load bar to a conveyor system having a continuous path of travel. The connections between the load bar and the continuous conveyor system include two spaced apart points of attachment. At least one point of attachment is movable with respect to the other whereby the distance between the two points of attachment may vary as the load bar travels along the continuous path of the conveyor system to which the load bar is attached. This arrangement enables a load bar of significant length to negotiate a 90 degree turn along the path of travel of the conveyor system even when the radius of curvature of such 90 degree turn is significantly less than the length of the load bar.

Preferably the movable point of attachment includes a longitudinal oriented slotted track on the elongate load bar and a track wheel positioned in the track for movement along the track as the distance between the two points of attachment varies. Additionally, the two spaced apart points of attachment each include a trunion having a horizontal axis of rotation arranged perpendicular to the path of travel of the conveyor to which to load bar assembly is attached. The points of attachment are free to rotate about the horizontal axis of rotation of each trunion when the load bar makes elevational changes along inclined paths. The two spaced apart points of attachment also include a vertical axis of rotation so that each point of attachment is free to rotate about its respective vertical axis of rotation as the load bar travels along curved portions of the continuous path of the conveyor system to which the load bar is attached.

Preferably the connection between the load bar and the conveyor system comprises one fixed point of attachment and one movable point of attachment so that the distance therebetween may be shortened as the load bar travels along the curved portions of continuous path of the conveyor system to which the load bar is attached.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 1 is a schematic top plan view of a continuous conveyor system and a load bar assembly with several additional positions of the load bar assembly shown in phantom outline, according to the present invention;

FIG. 2 is an enlarged side elevational view of the continuous conveyor system and load bar assembly shown in FIG. 1;

FIG. 3 is a side elevational view of another load bar assembly, according to the present invention;

FIG. 4 is a cross-sectional view taken along line 4—4 of FIG. 3;

FIG. 5 is a side elevational view of the load bar assembly illustrated in FIGS. 1 and 2 but shown on an inclined portion of the continuous conveyor system, according to the present invention;

FIG. 6 is a side elevational view illustrating the movable connection point between the continuous conveyor system and the load bar assembly, according to the present invention;

FIG. 7 is a top plan view of the movable connection point shown in FIG. 6;

FIG. 8 is a front elevational view of the movable connection point shown in FIG. 6 with portions thereof broken away to illustrate interior details; and FIG. 9 is a side elevational view of still another load bar assembly, according to the present invention.

DETAILED DESCRIPTION OF THE INVENTION

Referring in more particularity to the drawings, FIGS. 1 and 2 illustrate a load bar assembly 10 for use with a continuous conveyor system 12. Fundamentally, the conveyor system includes a continuous overhead tramway 14 having a predetermined path of travel depending upon the industrial facility in which the continuous conveyor system is utilized. FIG. 1 shows a path of travel comprising a simple elongate configuration having two 180 degree turns at the opposite ends thereof. Tramway 14 is appropriately suspended or otherwise supported in its overhead position in a fixed and stable manner. As shown best in FIG. 8, tramway 14 has an I-shaped cross-section thereby providing a pair of tracks 16 on opposite sides of an interconnecting web 18.

The continuous conveyor system also includes a continuous chain 20 appropriately mounted directly below tramway 14 and following the same path of travel as the tramway. As explained more fully below, the load bar assembly is supported by the tramway and motivated by the chain as the chain is driven by an appropriate drive mechanism (not shown).

Load bar assembly 10 basically includes an elongate load bar 22 having sufficient rigidity and strength along its length from one end to the other. The load bar includes a series of spaced apart openings 24 along its lower edge for supportedly engaging hanger elements 26 attached to goods 28 for transport of the goods along continuous conveyor system 12. The load bar is secured to the tramway 14 of the continuous conveyor system by a pair of spaced apart trolley assemblies 30, 32. Each of these trolley assemblies includes a basic framework 34 extending between the tramway and the load bar. Each framework 34 includes a pair of spaced apart vertical arms 36 interconnected at their lower ends to an intermediate member 38. Each arm is pivotally connected to the intermediate member 38 about a horizontal axis perpendicular to tramway 14. The upper end of each arm 34 includes rollers 40 that ride in the tracks 16 of the tramway, as shown best in FIG. 8.

Trolley assembly 30 is fixedly secured to load bar 22 by a pivotal connection 42 secured to the intermediate member of framework 34 for rotational movement about a horizontal axis perpendicular to the tramway and a vertical axis extending through the pivotal connection 42. As explained more fully below with respect to trolley assembly 32, connection 42 includes a trunion 44 that provides the rotation about the horizontal axis. A cylindrical rod 46 extends through the trunion and the lower end of the rod is pivotally connected to the load bar for rotation about a horizontal axis perpendicular to the tramway. Rod 46 is fixed to trunion 44 but free to rotate about its vertical axis.

Turning now to trolley assembly 32, trunion 44 comprises a block 48 journaled to opposite spaced apart sides 50 of intermediate member 38 by stub shaft members 52 extending from outside sides 50 into block 48. The stub shafts are fixed to the block by a threaded connection but these shafts are free to rotate relative to sides 50 through which they extend. The interior of block 48 has a vertical bore 56, and a grease fitting 57 communicates with the bore for supplying lubricant. A cylindrical rod 58 extends through the bore. Rod 58 is fixed to block 48 but free to rotate about a vertical axis. In this regard, an upper washer/roller bearing 59A and a lower washer/roller bearing 59B enable rod 58 to rotate about its vertical axis. The lower end of rod 58 is connected to a yoke 60 having a pair of spaced apart wheels 62 each mounted for rotation about a horizontal axis perpendicular to the tramway.

Trolley assembly 32 is movably connected to load bar 22. In this regard, load bar 22 includes an elongated longitudinally oriented track 64, and the wheels 62 ride within the track to supportingly engage the load bar. The arrangement is such that the trolley assembly 32 is capable of moving toward and away from the fixed trolley assembly 30 as the load bar moves along the path of travel of the continuous conveyor.

As previously described, continuous conveyor system 12 includes continuous chain 20 directly below tramway 14. The vertical arms 36 of each trolley assembly extend through links in the chain, as shown best in FIG. 2. Accordingly, as chain 20 moves along the path of travel of the conveyor system, both trolley assemblies 30, 32 move with the chain to thereby transport the load bar and the goods suspended therefrom along the path of travel of the conveyor.

The load bar 22 of the present invention has a length significantly longer than the radius of curvature of any of the 90/180 degree turns of the conveyor system. The distance between the points of attachment to the continuous conveyor along a straight run is significantly longer than such radius of curvature. Normally, it is impossible to utilize a load bar length longer than the smallest radius of curvature of the path of travel of the load bar. However, with trolley assembly 32, and particularly the movable connection between the load bar and the trolley assembly, the significantly longer load bar 22 is capable of traversing the tight turns of the path of travel of the conveyor.

As shown in FIG. 1, the distance between the points of attachment of each trolley assembly 30, 32 is shortened as the load bar moves through the turns of the conveyor system and the track wheels 62 move along track 64 of the load bar. This shortening of distance between the trolley assemblies enables the significantly longer load bar to negotiate these turns.

The following is provided as a representative example with respect to the significant advantages of the present load bar assembly.

Assuming a conveyor system presently utilizes a 4 foot load bar with fixed connection points at the ends of the bar, a conveyor turning radius of 4 feet is minimally needed to accommodate this 4 foot load bar. If this system were to be upgraded to a 15 foot load bar with fixed connection points at the ends of the bar, a turning radius of a minimum of 15 feet would be needed to allow non-binding of the new load bar size. A 180 degree turn with a 4 foot load bar would take 8 feet of factory floor space. For a 15 foot load bar, this turn would need 30 feet of factory space. However, with the load bar assembly of the present invention, only a path A (FIG. 1) of 3.5 feet would have to be cleared from the existing 8 foot radius to make way for the new 15 foot load bar. Very significant savings are obtained since the existing conveyor system would not have to be moved, and 400% less factory floor space can be saved from what would have been needed for a 15 foot radius [(30'−16')÷3.5'(100%)=400%].

FIG. 5 simply illustrates the load bar assembly 10 and continuous conveyor system 12 with the load bar making an elevational change by traveling along an inclined section of the conveyor system. The connections between the conveyor system and the load bar pivot about the trunions and also about a lower horizontal pivot point 66 at the lower end of cylindrical rod 46 where the rod connects to the load bar. Wheels 62 provide similar movement for rod 48.

FIGS. 3 and 4 illustrate an alternate embodiment of the present invention primarily including a slightly different load bar 70. In this regard, load bar 70 has a longitudinally oriented track 72 with a V-shaped support surface 74 at the upper boundary of the track. Wheels 76 attached to yoke 60 of trolley assembly 32 ride along track surface 74 as the trolley assemblies move toward and away from one another. Each of the wheels 76 has an inclined inner surface 78 that engages the V-shaped support surface. Otherwise, the load bar assembly shown in FIGS. 3 and 4 is similar to the load bar assembly of FIGS. 1 and 2, and similar reference characters are used to identify similar parts.

FIG. 9 shows another embodiment of the invention and here again similar reference characters are utilized to identify similar parts. In this embodiment a load bar 80 basically comprises two parts 82, 84 which telescope into one another to facilitate varying the distance between the trolley assemblies 30, 32. This enables the load bar to negotiate turns within the conveyor system when the overall length of the load bar and the distance between the points of attachment along a straight run are significantly greater than the radius of the curvature of the turns, for the same reasons as explained above.

What is claimed is:

1. A load bar assembly comprising an elongate load bar, connection means for securing the load bar to a conveyor system having a continuous path of travel, the connection means including two spaced apart points of attachment, at least one point of attachment being movable with respect to the other point of attachment whereby the distance between the two points of attachment varies as the load bar travels along the continuous path of the conveyor system to which the load bar is attached, and the connection means further including a horizontal pivot at each of the spaced apart points of attachment whereby the load bar is capable of elevational changes by traveling along inclined sections of the continuous path of the conveyor system to which the load bar is attached as the connection means pivots about the horizontal pivots.

2. A load bar assembly as in claim 1 wherein the movable point of attachment includes a slotted track on the elongate load bar and a track wheel positioned in the track for movement along the track as the distance between the two points of attachment varies.

3. A load bar assembly as in claim 1 wherein each horizontal pivot includes a trunion having a horizontal axis of rotation arranged generally perpendicular to the path of travel of the conveyor to which the load bar assembly is attached whereby the points of attachment are free to rotate about the horizontal axis of rotation of each trunion when the load bar makes elevational changes along inclined paths.

4. A load bar assembly as in claim 1 wherein the two spaced apart points of attachment each include a vertical axis of rotation whereby each point of attachment is free to rotate about its respective vertical axis of rotation as the load bar travels along the continuous path of the conveyor system to which the load bar is attached.

5. A load bar assembly as in claim 1 in combination with a conveyor system having a continuous path of travel including a number of 90 degree turns, the conveyor system including a continuous overhead tramway and a continuous chain below the tramway both arranged along the path of travel, and wherein the two spaced apart points of attachment each include wheels supportingly engaging the overhead tramway and fixed to the chain.

6. A load bar assembly and conveyor system combination as in claim 5 wherein the movable point of attachment includes a slotted track on the elongate load bar and a track wheel positioned in the track for movement along the track as the load bar traverses the 90 degree turns and the distance between the two points of attachment varies.

7. A load bar assembly and conveyor system combination as in claim 6 wherein at least one of the 90 degree turns of the path of travel of the conveyor system has a radius of curvature R and the elongate load bar has a length significantly longer than R, and wherein the distance between the two points of attachment along a straight run of the conveyor system is significantly longer than R.

8. A load bar assembly comprising an elongate load bar, connection means for securing the load bar to a conveyor system having a continuous path of travel, the connection means including two spaced apart points of attachment, at least one point of attachment being movable with respect to the other point of attachment whereby the distance between the two points of attachment varies as the load bar travels along the continuous path of the conveyor system to which the load bar is attached, and wherein the two spaced apart points of attachment include one point of attachment being fixed and the other point of attachment being movable with respect to the fixed point of attachment whereby the distance between the fixed and movable points of attachment varies as the load bar travels along the continuous path of the conveyor system to which the load bar is attached.

9. A load bar assembly as in claim 8 wherein the movable point of attachment includes a slotted track on the elongate load bar and a track wheel positioned in the track for movement along the track as the distance between the two points of attachment varies.

10. A load bar assembly as in claim 9 wherein the two spaced apart points of attachment each include a trunion having a horizontal axis of rotation arranged generally perpendicular to the path of travel of the conveyor to which the load bar assembly is attached whereby the fixed and movable points of attachment are free to rotate about the horizontal axis of rotation of each trunion when the load bar makes elevational changes along inclined paths.

11. A load bar assembly as in claim 10 wherein the two spaced apart points of attachment each include a vertical axis of rotation whereby each point of attachment is free to rotate about its respective vertical axis of rotation as the load bar travels along the continuous path of the conveyor system to which the load bar is attached.

\* \* \* \* \*